United States Patent [19]

Murray

[11] Patent Number: 5,297,200
[45] Date of Patent: Mar. 22, 1994

[54] COMPUTER SECURITY SYSTEM

[75] Inventor: Douglas Murray, Glasgow, Scotland

[73] Assignee: Nighthawk Electronics Limited, London, England

[21] Appl. No.: 54,723

[22] Filed: Apr. 28, 1993

Related U.S. Application Data

[63] Continuation of Ser. No. 768,296, Oct. 1, 1991, abandoned.

[30] Foreign Application Priority Data

Apr. 1, 1989 [GB] United Kingdom ............. 8907412.4

[51] Int. Cl.<sup>5</sup> ............................................. H04L 9/00
[52] U.S. Cl. ................................... 380/4; 380/25; 340/825.34
[58] Field of Search ............... 380/3, 4, 23, 24, 25, 380/52; 395/425, 725; 439/678, 620, 651, 638, 639, 654; 200/51.02, 51.03, 51.04, 51.05, 51.06, 51.11, 43.01, 43.02; 340/825.31, 825.34, 825.5

[56] References Cited

U.S. PATENT DOCUMENTS

| | | | |
|---|---|---|---|
| 4,236,779 | 12/1980 | Tang | 439/638 X |
| 4,757,163 | 7/1988 | Rabey et al. | 200/51.03 |
| 4,787,027 | 11/1988 | Prugh et al. | 380/24 X |
| 4,879,645 | 11/1989 | Tamada et al. | 380/4 X |
| 4,910,775 | 3/1990 | Yves et al. | 380/25 |
| 4,951,249 | 8/1990 | McClung et al. | 380/23 X |
| 5,067,155 | 11/1991 | Bianco et al. | 380/25 |
| 5,093,862 | 3/1992 | Scwartz | 380/25 |
| 5,150,420 | 9/1992 | Haraguchi | 340/825.34 X |
| 5,187,352 | 2/1993 | Blair et al. | 380/25 X |
| 5,212,729 | 5/1993 | Schafer | 380/4 |

OTHER PUBLICATIONS

Anonymous; "Port Extender"; Research Disclosure; Jan. 1991, No. 321; K. Mason Publications.

Primary Examiner—Tod R. Swann
Attorney, Agent, or Firm—Needle & Rosenberg

[57] ABSTRACT

A security system for a computer (10) having at least one communications port (12) for connection to peripheral devices, includes a card reader (14). A switching means (22) connected to the card reader and connectible to the communications port, is operable to connect the card reader to the communications port in response to a command including protected routines which generate said command to cause the switching means to connect the card reader to the communications port. Suitable software compares data from a card read by the card reader with authorisation data held in the computer, to enable or disable further operation of the protected routine(s).

12 Claims, 2 Drawing Sheets

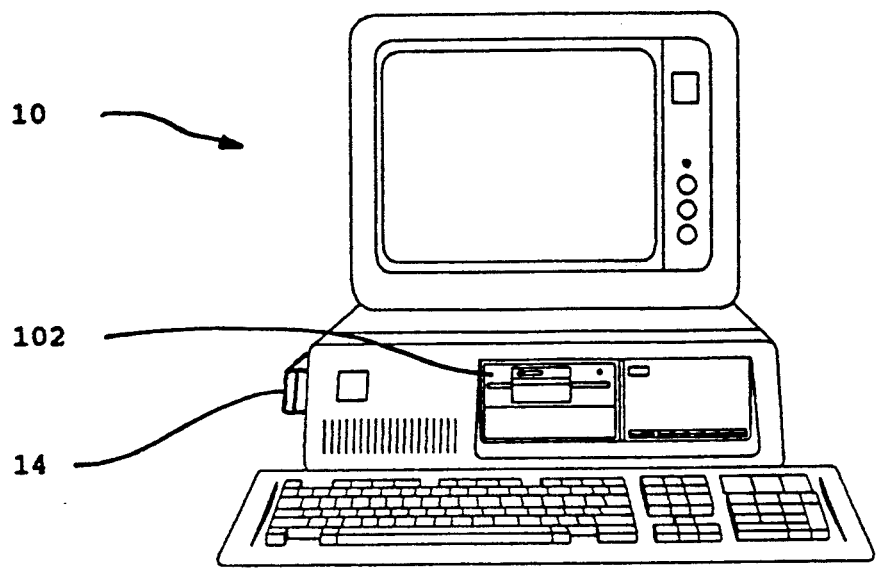
FIGURE 1
FIGURE 2
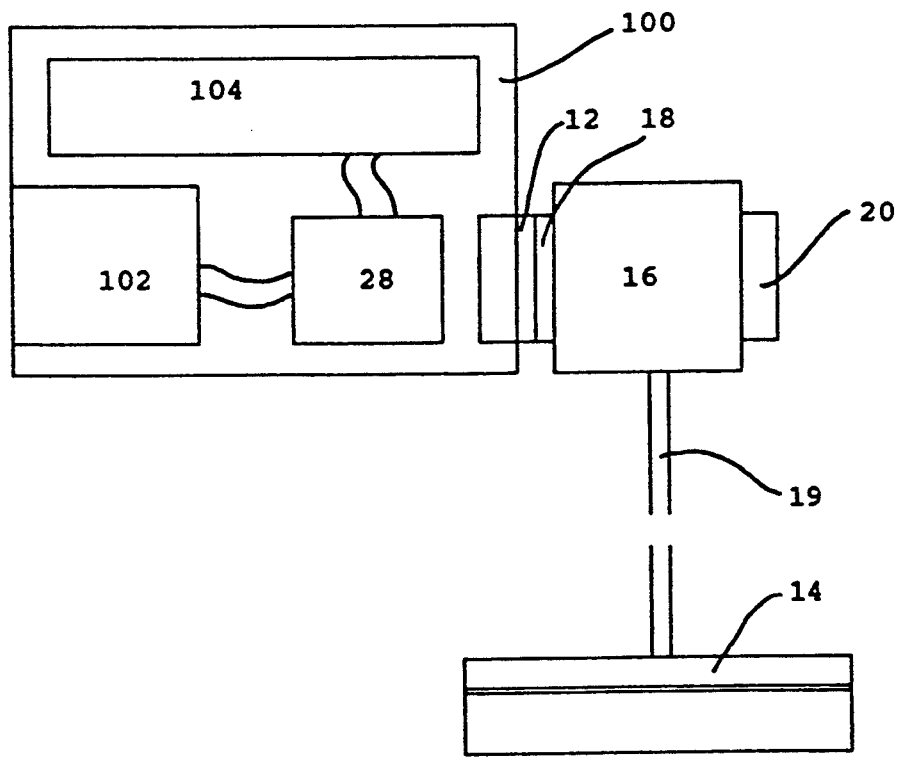

COMPUTER SECURITY SYSTEM

This application is a continuation of application Ser. No. 07/768,296, filed Oct. 1, 1991, now abandoned.

This invention relates to a means of restricting access to computer files.

The large amount of confidential data on files held by many computers and the expense involved in accessing outside data systems via a modem, makes it imperative to ensure that access to such data and systems is restricted to certain authorised users. At present one of the usual methods of restricting access involves entering a code via the keyboard. However, as the computer must contain a program which recognises the code, an expert can gain entry to the data files by calling up and then modifying the program. It is also possible to provide a mechanical lock system, but this is not a practical means of controlling a variety of levels of authorised access to given types of data or peripherals.

According to the present invention there is provided a security system for a computer having at least one communications port for connection to peripheral devices; the system having a card reader; switching means operable to connect the card reader to the communications port in response to a command, including protected routine(s) which generate said command to cause the switching means to connect the card reader to the communications port; and means for comparing data from a card read by the card reader with memorised authorisation data to enable or disable further operation of the protected routine(s).

Preferably, the switching means operates to connect the card reader and a peripheral device alternatively to a single communications port.

In a particularly preferred form, the switching means is comprised in an adapter package which includes a plug for connection into a communications port socket, a socket for receiving a peripheral device plug, and a cable connection to a stand-alone card reader.

Preferably, said computer is an IBM personal computer (or compatible) having a hard disk drive, and the usual serial communication port.

The card reader is preferably a swipe reader, having two of the three standard outputs i.e. CLOCK negative logic and DATA negative logic. These two outputs connect to two inputs in the computer via the switching means. The inputs in the computer (which usually connect with two data set inputs) may thus be controlled by the switch means, which in turn is controlled by the software system.

The software system may be made up of various files e.g. a system file, an installation file and a utility file. These allow access to the computer when the card is used at various levels of security.

The software system controls the switch means by setting output levels and monitoring input signals by polling the input signals and processing the changes as the card is swiped. It is possible to use interrupts instead of polling.

The above system may be used with the usual communication port uses e.g. to modem, mouse or serial printer.

In order to ensure that the security software cannot be circumvented, access to floppy disc drives on the computer is preferably prevented. This may be achieved by inserting a circuit board between the computer's main system board and the floppy disc drive, to intercept the disc control signals and prevent access to the disc drive until a specified control sequence is received on the disc drive interface from the controlling software. This control sequence is arranged to be sent only once the user has been authenticated on the'system An embodiment of the invention will now be described by way of example, with reference to the accompanying drawings, in which:

FIG. 1 is a perspective view of a computer system;

FIG. 2 is a block diagram of the computer system illustrating a card reader and adapter used in the system of the invention.

Figure 3:
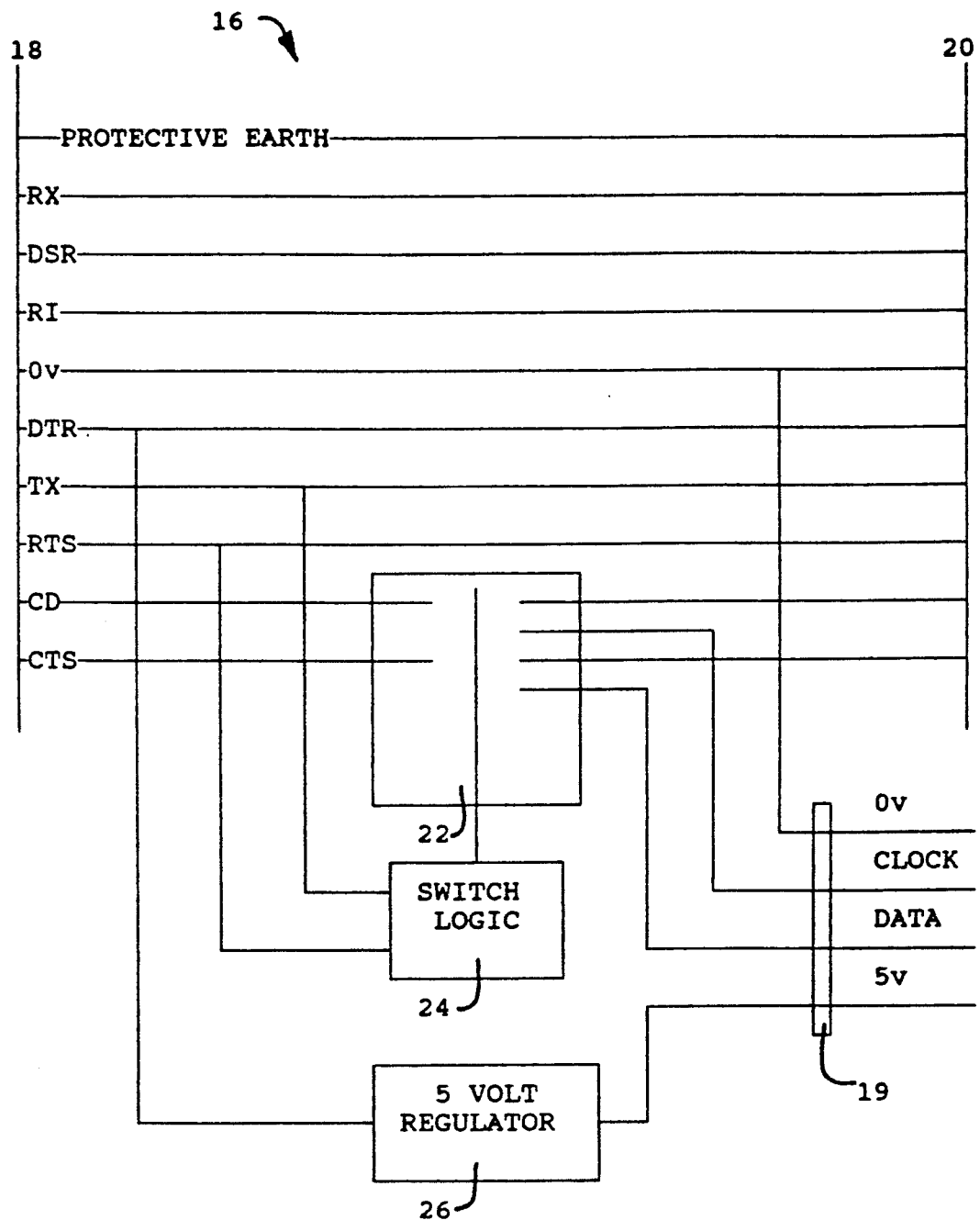
FIG. 3 is a block diagram of the circuitry of the adapter.

The preferred embodiment makes use of an IBM PC (or compatible computer) 10 having a communications port socket 12 and a floppy disk drive 102, and a Card reader 14. The card reader 14 is permanently wired by cable 19 to an adapter 16 Which has a plug 18 for engagement in the communications port socket 12 and also has a similar socket 20 into which any desired peripheral device (not shown) may be connected.

The card reader 14 is a standard swipe reader meeting ISO 3554 track two standard; it requires 0 volt and 5 volt electrical supplies and its outputs are:

1. CARD PRESENT negative logic.
2. CLOCK negative logic.
3. DATA negative logic.

The way that data is retrieved in all systems employing such readers is that data is formed by the data signal being present or not during a 'clock' signal transition from high to low. Each transition is one bit and 5 bits equal one digit plus parity, the lower 4 bits equal a binary coded decimal number. The 'card present' signal signals the start and end of the card information. The system described here uses only CLOCK and DATA signals.

In order to ensure that the security software cannot be circumvented, access to the floppy disc drive 102 in the computer is prevented by means of a circuit board 28 inserted between the computer's main system board 104 and the floppy disc drive 102, to intercept the disc control signals and prevent access to the disc drive until a specified control sequence is received on the disc drive interface from the controlling software. This control sequence is arranged to be sent only once the user has been authenticated on the system. For this purpose a single GAL chip is used on the circuit board to intercept the control signals and to decode the enable sequence. The GAL chip may include a security fuse to ensure that its contents cannot be read out. Once the enable or disable signal is received, the GAL does not respond to any further commands. This stops experimentation by potential hackers.

Referring to FIG. 3, the IBM PC or compatible serial communication port 12 (termed COM 1 to COM 4) has 3 outputs and 5 inputs which are used to connect to data set equipment. To allow the card CLOCK and DATA signals to connect to two inputs, the adapter 16 has an electronic switch 22 which is employed to disconnect two data set inputs and connect the two card signals. The switch 22 is activated by the PC setting two of its outputs to a level which is inconsistent with normal data set equipment, i.e. Request To Send (RTS) signal=-OFF and Transmit (TX) signal =ON. This condition is sensed by switch logic 24 to operate switch 22, thus connecting the card signals to the inputs Carrier Detect (CD) and Clear To Send (CTS).

The 5 volt power requirement for the card reader 14 and the electronic switch 22 is derived from the output signal Data Terminal Ready (DTR) via a voltage regulator 26. The input signals for the card reader, CTS and CD, could be any input except Receive (RX). It is the function of a software driver program SECURITY.SYS to activate the switch by setting the defined output levels and to monitor input signals by polling the input signals and processing the changes as the card is swiped. It is possible to use interrupts instead of polling.

It will appreciated that in normal use of the computer, the communications port operates normally with any peripheral device connected to the adapter socket 20. It is only when the software calls for a security verification by setting RTS=OFF and TX=ON that the peripheral is disconnected and the card reader 14 is connected.

The card itself may contain a total of 40 digits. The first digit and the last two digits are start sentinel, end sentinel and check digit respectively, leaving 37 digits which the software driver passes to a CARD CHECK program. The digits are used to identify a particular user. Data is held on the computer to define the following items for each user:
1. Card Number
2. Privilege Level Number
3. User Name
4. PUN requirement
5. Floppy drive access permission where the following definitions are used:

CARD NUMBER: Any time the CARD CHECK program is called, it will not allow the user to continue unless this number on the card matches an entry in a preprogrammed table of numbers. As the CARD CHECK program is called at 'power up', only specified cards can enable the system to operate.

USER GROUP No: After 'power up', PCs and compatibles are capable, through the AUTOEXEC.BAT file, of executing one application directly, without input from the user. The program CARD CHECK, when used in an AUTOEXEC.BAT file, return an ERROR LEVEL number equal to this number to the AUTOEXEC.BAT file. It is possible to process this number to execute one of 9999 applications directly from 'power up'.

PRIVILEGE LEVEL NO: Its main function is to provide the ACCESS LEVEL to a program/file which has been LOCKED using a utility program LOCK.COM. Programs/files which have been LOCKED are not usable (even when copied) unless the DRIVER returns a PRIVILEGE LEVEL equal to or higher than that applied to the program/file when LOCKED. It is also used to restrict access to the user setup program.

PUN Requirement: This defines whether or not a PUN is required for this user. Using the card and a MACHINE KEY NUMBER (preprogrammed), an algorithm produces a four digit PERSONAL USER NUMBER. The CARD CHECK program can ask the user to input this PUN and a comparison is made before returning to the application. This feature may also be a KEY to unLOCK programs/files which have this key applied when LOCKED.

The software module is installed in the computer memory at 'power up' through the CONFIG.SYS file and communicates with the card reader on 'power up' and on request by an application. The software may comprise a number of files, for example a system file; an installation file and various utility files. These may be made up and operate as follows:

System file : SECURITY.SYS
Installation file : INSTALL.COM
Utility files :
  CARD.COM
  CARD2.COM
  INCARD.COM
  PUNCARD.COM
  LOCK.COM
  UNLOCK.COM SECURITY.SYS: This is a system file (DRIVER) which is loaded from the CONFIG.SYS file at 'power up'. This software accepts a request via a DOS interrupt and returns card data to the calling program when the request has been executed. Valid requests are:
1. Return card data from the last card input.
2. Return card data from a new valid card input.
3. Ask for PUN on the last card input and return card data if the PUN is valid.
4. Ask for the PUN on a new valid card input and return card data if both the card and PUN are valid.
5. As in request 4, but returns without checking the PUN and with the PUN appended to the card data.

(A valid card is defined as having the correct User Group ID.)

INSTALL.COM: This program allows the user to define the USER GROUP IDENTITY NUMBERS and insert them into the DRIVER prior to installing on the hard disk. It also allows the MACHINE KEY NUMBER to be input and also the facility to disable a PUN input at power up. A view facility allows the user to view details on a driver already installed on disc and to create PERSONAL USER NUMBERS relative to a MACHINE KEY NUMBER.

CARD.COM: A program which, when used in a batch file, will return an ERROR LEVEL number equal to that defined as the BATCH NUMBER on the last card input.

CARD2.COM: As defined in CARD.COM but returns the PRIVILEGE LEVEL NUMBER as the ERROR LEVEL.

INCARD.COM: A program which requires the input of a new card before returning an ERROR LEVEL as defined in CARD.COM.

PUNCARD.COM: As defined in CARD.COM but requires the input and validation of a PERSONAL USER NUMBER before returning.

LOCK.COM: This program will alter fILes with the extension .EXE or .COM making them usable in an environment without a 'PC SECURITY.SYS' system installed. In addition it tags the file with a PRIVILEGE LEVEL number and KEY. The KEY the file with defines how to derive the user's PRIVILEGE LEVEL when the program is executed.

Security level
  KEY
    01 - from last card input
    02 - from a new card input
    03 - from last card when valid PUN input
    04 - from a new card when valid PUN input The program will execute only when the user's security level is equal to or higher than that on the TAG.

UNLOCK.COM: Restores locked files to their original form.

Other file arrangements may be used. Detailed implementations of software for carrying the invention into effect will be readily apparent to those skilled in the art.

The invention thus allows a conventional computer to be modified in a simple manner to provide a system with a high degree of security which may operate in a versatile manner.

I claim:

1. A security system for a computer (10) having at least one external serial communications port (12),
   the external serial communications port comprising a plurality of inputs and outputs for connection to a peripheral device,
   the security system comprising:
   a card reader (14);
   switching means (22) connected to the card reader and connectable to the external serial communications port, the switching means being operable to connect the card reader to at least a portion of the inputs of the external serial communications port and to disconnect the same portion of the inputs from the peripheral device in response to a command including protected routines which generate said command to cause the switching means to connect the card reader to the at least a portion of the inputs of the external serial communications port; and
   means for comparing data, read from a card by the card reader, with authorization data held in the computer, to enable or disable further operation of the protected routine.

2. A system according to claim 1, wherein the switching means (22) operates to connect the card reader and a peripheral device alternatively to a single external serial communications port (12).

3. A system according to claim 1, wherein the switching means (22) is provided in an adapter (16) which includes a plug (18) for connection to an external serial communications port socket (12), a socket (20) for receiving a peripheral device plug, and a cable connection (19) to the card reader 4. A system according to claim 1, wherein the card reader is a swipe reader having two of the three standard outputs i.e. CLOCK negative logic and DATA negative logic, the two outputs connecting, in use, to two inputs in the computer via the switching means, whereby the inputs in the computer (which usually connect with two data set inputs) may be controlled by the switch means.

5. A system according to claim 1, wherein the means for comparing data from a card read by the card reader with authorization data held in the computer, comprises software held, in use, in the computer.

6. A system according to claim 1, further including means (28) for preventing access to floppy disc drives on the computer, the means comprising a circuit board insertable between the computer's main system board (30) and its floppy disc drive (32), to intercept the disc control signals nd prevent access to the disc drive until a specified control sequence is received on the disc drive interface from the controlling software.

7. A computer system (10) having at least one external serial communications port (12) for connection to peripheral devices, and including a security system according to claim 1.

8. A system according to claim 7, wherein the switching means (22) operates to connect the card reader and a peripheral device alternatively to a single external serial communications port (12).

9. A system according to claim 7, wherein the switching means (22) is provided in an adapter (16) which includes a plug (18) for connection to an external serial communications port socket (12), a socket (20) for receiving a peripheral device plug, and a cable connection (19) to the card reader.

10. A system according to claim 7, wherein the card reader is a swipe reader having two of the three standard outputs i.e. CLOCK negative logic and DATA negative logic, the two outputs connecting, in use, to two inputs in the computer via the switching means, whereby the inputs in the computer (which usually connect with two data set inputs) may be controlled by the switch means.

11. A system according to claim 7, wherein the means for comparing data from a card read by the card reader with authorization data held int he computer, comprises software held, in use, in the computer.

12. A system according to claim 7, further including means (28) for preventing access to floppy disc drives on the computer, the means comprising a circuit board insertable between the computer's main system board (30) and its floppy disc drive (32), to intercept the disc control signals and prevent access to the disc drive until a specified control sequence is received on the disc drive interface from the controlling software.

* * * * *